(12) United States Patent  
Weisgerber (10) Patent No.: US 9,277,169 B2  
(45) Date of Patent: Mar. 1, 2016

(54) METHOD FOR ENHANCING MOTION PICTURES FOR EXHIBITION AT A HIGHER FRAME RATE THAN THAT IN WHICH THEY WERE ORIGINALLY PRODUCED

(71) Applicant: Robert C. Weisgerber, New York, NY (US)

(72) Inventor: Robert C. Weisgerber, New York, NY (US)

( * ) Notice: Subject to any disclaimer, the term of this patent is extended or adjusted under 35 U.S.C. 154(b) by 364 days.

(21) Appl. No.: 13/815,327

(22) Filed: Feb. 21, 2013

(65) Prior Publication Data

US 2014/0232933 A1  Aug. 21, 2014

(51) Int. Cl.
*G03B 21/32* (2006.01)
*H04N 7/01* (2006.01)
*H04N 5/253* (2006.01)

(52) U.S. Cl.
CPC .............. *H04N 7/0127* (2013.01); *G03B 21/32* (2013.01); *H04N 5/253* (2013.01); *H04N 7/0112* (2013.01); *H04N 7/0135* (2013.01)

(58) Field of Classification Search
USPC ........... 352/38, 40, 41, 44, 46, 47, 81, 84, 92, 352/85, 101, 236, 244
See application file for complete search history.

(56) References Cited

U.S. PATENT DOCUMENTS

| | | | | |
|---|---|---|---|---|
| 5,627,614 A * | 5/1997 | Weisgerber | ...................... | 352/46 |
| 5,739,894 A * | 4/1998 | Weisgerber | ...................... | 352/46 |
| 5,943,096 A * | 8/1999 | Choo | ........................ | 375/240.16 |
| 6,192,079 B1 * | 2/2001 | Sharma et al. | ............ | 375/240.16 |
| 6,243,156 B1 * | 6/2001 | Weisgerber | ...................... | 352/46 |
| 6,377,621 B2 * | 4/2002 | Borer | ............................ | 375/240 |
| 6,900,846 B2 * | 5/2005 | Lee et al. | ....................... | 348/459 |
| 7,197,075 B2 * | 3/2007 | Akimoto et al. | .......... | 375/240.16 |
| 7,564,902 B2 * | 7/2009 | Sasai et al. | ................ | 375/240.26 |
| 2002/0149696 A1 * | 10/2002 | Cok et al. | ....................... | 348/459 |
| 2003/0016750 A1 * | 1/2003 | Cok | .......................... | 375/240.16 |
| 2003/0169404 A1 * | 9/2003 | Weisgerber | ..................... | 352/60 |
| 2006/0072073 A1 * | 4/2006 | Weisgerber | ..................... | 352/86 |
| 2006/0244917 A1 * | 11/2006 | Weisgerber | ..................... | 352/84 |

* cited by examiner

*Primary Examiner* — William C Dowling
(74) *Attorney, Agent, or Firm* — David Peter Alan (57) ABSTRACT

Previously-produced motion pictures are enhanced for theatrical exhibition, at double the frame rate at which they were originally produced. New, rendered images are interpolated between each of the images of the original motion picture. These new images are generated by computer software that analyzes the actual horizontal and vertical displacement of each pixel of every image of the original motion picture, so the interpolated images accurately depict the exact image that would have been captured, if the original motion picture had originally been produced at double the actual frame rate of production. This enhancement technique can be used for an entire motion picture, or selectively for certain scenes or sequences. For image components containing complex motion, those components are selected for treatment to correct for such complexity. The entire process can be executed automatically. In the preferred embodiment, the pictures are projected through digital means at 48 frames-per-second.

19 Claims, 2 Drawing Sheets

FIG. 1

PRIOR ART

METHOD FOR ENHANCING MOTION PICTURES FOR EXHIBITION AT A HIGHER FRAME RATE THAN THAT IN WHICH THEY WERE ORIGINALLY PRODUCED

FIELD OF THE INVENTION

This invention relates to the enhancement of previously-produced motion pictures for exhibition to audiences in motion picture theaters, with upgraded quality of presentation, compared to that obtainable from the motion pictures as originally produced.

BACKGROUND OF THE INVENTION

Most motion pictures produced for conventional theatrical exhibition are photographed at the frame rate of twenty-four frames-per-second, which has been in use for most of the history of cinema. At that frame rate, there persist undesirable artifacts that detract from the presentation of high-quality images, which is one of the goals of modern motion picture production and presentation. Movies shot and presented on film at 24 frames-per-second often have flicker, perceptible grain and motion artifacts, and an appearance that lacks immersive character. This latter artifact is particularly objectionable on large theater screens (fifty feet or more in width), since any image component appears to move a greater physical distance between discrete images on a large screen than on a smaller screen.

Films shot at higher frame rates succeeded, to some extent, in suppressing these undesirable artifacts. *Cinerama* (three synchronized 35 mm, 6-perforation filmstrips, photographed and projected at twenty-six frames-per-second, primarily used for travelogues) was somewhat successful in reducing flicker and improving resolution, and was immersive. The original Todd-AO system utilized photography at thirty frames-per-second, along with the conventional twenty-four, shot with another camera. A few motion pictures, including *Oklahoma* and *Around the World in Eighty Days*, were produced in that format. However, the use of separate photography at two different frame rates was costly, and few films were produced in the Todd-AO format. More recently, the inventor herein taught a means for transitioning between film sequences photographed for exhibition at twenty-four frames-per-second and other sequences photographed at thirty frames-per-second between scenes of a single motion picture (U.S. Pat. No. 5,096,286 (1992)). While there was a perceptible improvement in smoothness of motion at the higher frame rate, the latter system was never developed commercially.

More recently, Weisgerber has taught the use of forty-eight frames-per-second as a rate for photographing and showing motion pictures, to develop a presentation that suppresses the undesirable artifacts present at twenty-four frames-per-second (U.S. Pat. No. 5,627,614 (1997)). In that invention, certain sequences or certain image components are photographed at forty-eight frames-per-second, for a "high-impact" presentation. Other sequences or image components are photographed at twenty-four frames-per-second and double-frame printed, to retain the artifacts that gave the film the "legacy" look. With the entire motion picture produced according to that invention projected at forty-eight frames-per-second, it became possible to give certain portions of a motion picture film or certain image components a more realistic look, compared to other portions of the film or other image components.

The method of Weisgerber 614 works well only for new motion pictures, produced according to it. Because it calls for certain scenes or sequences to be photographed at 24 frames-per-second, and others to be photographed at 48 frames-per-second, it cannot be used to enhance motion pictures that were produced previously at the traditional rate of 24 frames-per-second. Weisgerber 614 called for certain portions of a motion pictures to be photographed at that speed and double-frame printed, but if a previously-existing motion picture photographed entirely at that frame rate were double-frame printed, it would still have the appearance of motion captured and displayed at 24 frames-per -second. Therefore, the method taught in Weisgerber 614 cannot be utilized for upgrading previously -produced motion pictures.

The theatrical cinema community is now recognizing and embracing the advantages of high-frame -rate presentation. The literature has recently featured high-frame-rate (HFR) photography and presentation as a topic of interest. Examples include: HFR Reactions, a SMPTE News Brief from Jan. 4, 2013, Goldman: Higher Frame Rates for 3-D: *SMPTE Newswatch*, November, 2012 (Peter Jackson's latest *The Hobbit* release and Douglas Trumbull's conversion of his ShowScan system to digital; "Playing HFR content in . . . theaters will therefore be possible, but not quick, simple, uniform or seamless"), Kaufman: The Aesthetics of High-Frame-Rate Cinema, *Creative Cow Magazine* (2012, quoting Steven Poster, President of the International Cinema Guild: "with the benefit of accumulated experience, the majority of moviegoers will adjust to the new language of 60 fps, and higher, motion picture, and will look back on the only 24 fps world in the way that we look back on black & white movies at 18 fps; quaint artifacts of another world."), "The Future of Cinema is Smooth, Crisp and Amazing," a slide show for exhibitors from www.christiedigital.com, March, 2012: "The biggest blockbusters are usually about immersive experiences and escapism—big, vibrant, high-action motion pictures" (at 2), "Filmmakers are now demanding the motion picture industry adopt HFR standards that reduce the motion blur, judder and strobing that's now common, and instead deliver enhanced/immersive 2D and 3D experiences for movie-goers. HFRs will give the tools and delivery platform they need to fully realize creative ideas" (at 4), "Digital cinema has turned into a fast-moving train, impossible to stop and largely driven by the box office performance of 3D movies" (at 6).

In an interview on May 12, 2012 for in70 mm.com, high-frame-rate pioneer Douglas Trumbull (inventor of the ShowScan 60-fps system, U.S. Pat. No. 4,477,160 (1984)), interviewer Wolfram Hannemann mentioned Trumbull's picture *Silent Running* (1972) and its production in the standard aspect ratio for 35 mm film, and asked: "So was it due to budgetary reasons that it was only 1:1.85?" Trumbull replied: "Yes—that was not enough money to make a big spectacle, in 70 mm." Trumbull also posted a statement on his web site, www.douglasstrumbull.com, on Jan. 11, 2012. Referring to James Cameron's digital production of *Avatar*, he said: "It does reveal . . . a frightening lack of industry-wide understanding of how to move forward toward a more powerful cinematic form and format that is more immersive."

Jeffrey Wells wrote in *Hollywood Elsewhere* on Apr. 29, 2012 (found at www.hollywood-elsewhere.com): "The bottom line is that, once younger audiences get a taste of it, 48 frames-per-second will be here to stay." This quotation sums up the call in the industry for higher frame rates, particularly 48 frames-per-second. All of these quotes were from articles written during the past year, which demonstrates that the motion picture industry wants high-impact presentation, with the quality associated with the 70 mm film format, at high frame rates, and produced at an affordable cost. As shall be shown, the present invention meets all of those needs.

If the predictions in the literature are accurate, a highly immersive presentation at a high frame rate will lure young viewers, who comprise the majority of today's audiences, into motion picture theaters. Only the market segment that enjoys the "classics" or motion pictures which utilize the legacy look for creative purposes would accept conventional 24-frame-per-second exhibition of films that were originally photographed at that frame rate. Emerging moviegoers will prefer the experience of watching motion pictures shot at a higher frame rate, rather than produced at the conventional frame rate of 24 frames-per-second. All the other aspects of "legacy" films, including the cinematography, story lines and talent of the performers, will be less desirable to future audiences, unless those motion pictures can be upgraded to provide the sort of immersive presentation that those audiences will expect.

The predictions in the literature indicate that only a motion picture that delivers the appearance of an immersive, high-frame-rate presentation will give contemporary audiences what they want. The upgrade described here would prevent the theatrical distribution value of essentially all of the motion pictures produced until now from being diminished by changing audience tastes, despite whatever artistic or other cinematic merits those motion pictures might have. Therefore, it the primary object of this invention to enhance motion pictures photographed and exhibited at a historic frame rate of 24 frames-per-second, and give them the exact appearance that they would have had, if they had originally been photographed and exhibited at the higher frame rate of 48 frames-per-second.

With the recent changes in motion picture technology, along with changes in the desire of contemporary viewers of motion pictures to experience a more immersive presentation than is available at 24 frames-per-second, it has become essentially impossible for previously-produced motion pictures to give these viewers the experience they are beginning to demand. This trend will become more apparent as more motion pictures are produced and exhibited at 48 frames per second or other high frame rates. In effect, the time-honored rate of 24 frames-per-second may soon become a part of cinema history. It will represent a "legacy" look that will appeal to the market segment that like "classic films" and enjoy that specific type of experience, but it will not appeal to the larger market segment that will expect a more immersive motion picture. These viewers will expect the clarity of images and the smoothness of motion in action scenes that is only available with higher frame rates.

The recent changes in motion picture technology will create a sharp line of demarcation between any motion picture produced in the future at a high frame rate, and any motion picture produced at the traditional frame rate, even if such movies were made recently. Without a means for previously-produced motion pictures to deliver the sort of experience available with new motion pictures, those movies will be regarded as part of cinema's past. Therefore, it is the primary object of this invention to provide a means for upgrading previously-produced motion pictures to deliver the quality of experience that is becoming available with new motion pictures.

The invention also does this in an economical manner, which is also one of its objects. If a motion picture was photographed at 24 frames-per-second, and a producer later decides to upgrade it for exhibition at 48 frames-per-second for any reason, the method disclosed here accomplishes that upgrade. In addition to its ability to upgrade previously-produced motion pictures, the invention can also be used to upgrade sequences of stock footage, on film or digitally-captured, for use with motion pictures specifically made for exhibition at high frame rates such as 48 frames-per-second. It can also be used for animation produced at 24 frames-per-second, as well as live action, resulting in a dimensionalized, multi-plane experience. The method eliminates judder and other artifacts of 24-frame-per-second production, including with CGI animation at that frame rate.

Most previously-existing motion pictures, even if they were produced recently, do not even meet the 1990s standard of Weisgerber 614. Most commercially produced films were, and still are, photographed at twenty-four frames-per-second, in the 35 mm feature film format, with four perforations per frame. That format did not allow for sufficient visual information storage to deliver the full effect of the previous Weisgerber invention, which required the 70 mm film format.

Under the present invention, films produced in the 35 mm format can be converted to a digital platform that can exceed the 70 mm film standard for this purpose, with exhibition by digital projection, although film projection could be used. Most importantly, twenty-four discrete images displayed during each second are not enough to provide for the smooth appearance of motion which the previous Weisgerber invention strove for, but could not fully deliver, since additional images would have been required. Unfortunately, analog film methods could not have captured images that would have displayed the look that a motion picture would have had, if it had actually been photographed at a higher frame rate. Film production and exhibition also adds undesirable amounts of judder and blurring to the transitional "in between" images that are blended through conventional image compositing. For this reason, the present invention does not blend pre-existing images at any time, but renders entirely new images for interpolation between original images, thereby doubling the amount of picture information contained in a motion picture.

The 48 frame-per-second frame rate is essential to the practice of the invention, and it can be used to upgrade any motion picture photographed at 24 frames-per-second, no matter when it was produced, or whether it was originally photographed on film or by digital image capture. With the upgrade to 48 frames-per-second for release, a motion picture enhanced according to the invention described here can also possess enhanced commercial value, because it will be distributed more widely, resulting in an additional revenue platform.

The invention disclosed here is resolution-independent, in that it can be used in connection with any resolution level presented to the viewers of a motion picture, including newly-developed high-resolution formats.

Smoothness of motion, as observed by the audience, is especially important in modern, large-screen motion picture theaters. These screens are, in many cases, fifty feet or more in width. Any finely-delineated motion projected onto such a wide screen must appear to traverse a greater distance on that screen between images than is traversed on older screens, which were seldom over forty feet wide. In order to display motion at 48 frames-per-second so it appear smooth, it is necessary to add a new extra image between each of the original images of a motion picture. This way, the large distance displaced by each picture element (pixel) from one image to the next does not impart a jerky appearance to the motion picture as projected. The present invention solves this problem by replicating exactly what each new, rendered image would have depicted if each of those images had been original images in a motion picture photographed at a high frame rate such as 48 frames-per-second.

It should be noted that other inventions have used variable frame rates for storage of digital motion picture images; see, e.g. Cok, U.S. Pat. No. 7,242,850, which teaches a method for storing such images at different frame rates for economy of storage space. The present invention teaches away from Cok by adding data in the form of new digital images, each such image placed between each image pair from the original motion picture. It is true that Cok manipulates frame rates by digital means in the practice of his invention, but his method works against the method disclosed here. Cok is drawn specifically to storing digital images with maximum efficiency and conservation of storage space. By doing so, he sacrifices the image texture, image quality and resolution that the present invention delivers. For example, Cok would only require one exposure of a shot to establish a location, even though that shot would be displayed on the screen for several seconds. When displayed, Cok's single exposure would exhibit a freeze-frame appearance, which lacks the texture and quality that would be present if the same shot were exhibited in multiple exposures, photographed at a frame rate that is the same as the display rate. Cok also calls for the blending of images to create the new images that he interpolates into the digital image sequences which he processes. It is an important feature of the present invention that there is no blending of images, and that new images are rendered for interpolation only by estimating the motion of each pixel and producing images that place each pixel where it would have been, if it had been captured at a moment in time exactly half-way between the instant at which the previous image in the original motion picture and next image in the original motion picture were captured.

By the Cok standard, the invention disclosed here is wasteful. The object of the present invention is to enhance image quality and resolution for viewers of motion pictures, primarily by taking previously-produced motion pictures produced at 24 frames-per-second, and upgrading them for exhibition at 48 frames-per-second. The invention is based on rendering a new image and inserting it between each image of the original motion picture and the next image in sequence. By doing this, the method disclosed doubles the amount of picture information contained in the motion picture. This is an inherent feature of the invention. There is a tradeoff between economical storage of data and increasing the amount of picture information to provide an enhanced viewing experience for audiences in motion picture theaters. The two goals are incompatible and militate in opposite directions. Cok optimizes efficient data storage, while the invention described here optimizes the viewer's experience by doubling the amount of information in a motion picture. By the Cok standard, the invention described here would be considered extremely wasteful. In effect, Cok compresses image data, while the present invention expands it.

The present invention also constitutes a significant improvement over Cok, because it takes advantage of technology that was unknown when the Cok invention was filed in 2001. Since that time, image quality has improved to the point where it is now possible to accomplish lossless image conversions. Digital files can be transferred and converted with no loss of resolution or image quality. Because of newly-available levels of efficiency in the processing of digital images, these transfers can be considered "lossless" in that new frames that are renderd by digital means look as good, in every aspect, as original frames from a previously-produced motion picture. The present invention teaches a method for rendering new frames and interpolating them between each frame of the original motion picture and its successor. For such an invention to work properly, the new frames must look as good, in every aspect, as the original frames. New efficiencies of digital data transfer allow this, but it could not have been contemplated when Cok reduced his invention to practice in 2001.

Even if the method taught by Cok were used for the purpose of the present invention, it would not succeed in delivering an appropriate cinematic presentation, free of artifacts. The mere use of variable frame rates, as utilized for slow-motion effects, is unsuitable for a high-impact presentation. One of the primary deficiencies of the prior art is that existing variable frame-rate methods are not capable of dealing effectively with complex motion, so that such motion could be presented to an audience in a form that is free of undesirable artifacts. By using software that "looks ahead" to place each pixel of each image in its proper position, the invention goes beyond the prior art and overcomes this deficiency.

Prior methods of synthesizing digital images also fail to produce the quality of images required for the practice of the present invention. For example, the method taught by Hazra, U.S. Pat. No. 6,369,614 and assigned to Intel Corp., may fulfill its object for images to be shown on a computer screen. On large motion picture theater screens, however, it fails to provide the resolution, smoothness of motion or image clarity, which are the objects of the present invention. For the smooth motion that contemporary audiences are accustomed to experiencing, due to its presence in other media, each pixel of a motion picture must appear to move only a short distance on the screen from one image to the next. On a screen fifty feet (600 inches or 1524 cm) wide with an image 2080 pixels wide, each pixel is nearly three tenths of an inch or three quarters of a centimeter wide. On such a large screen, it is critical that the apparent distance traveled on the screen between images be minimized, in order to display motion that appears smooth and free of unwanted artifacts. A rate of 48 frames-per-second allows each pixel to appear to move only half as far between images as a rate of 24 frames-per-second.

The primary difficulty with the method disclosed in Hazra 614 is that, if an image is found to be of unacceptable quality, Hazra's method calls for "aborting and repeating a previous frame" (claims 5, 17 and 21; see also claim 7). The feature that repeats entire frames when the quality of a particular frame is deemed unacceptable defeats the entire purpose of the present invention. If enough frames are repeated in a sequence, the result displayed to an audience would be similar to double-frame printing, as used in Weisgerber 614 for scenes or sequences of a motion picture when a high-impact audience effect is not desired. In other words, the Hazra method cannot prevent the result that portions of motion pictures are absolutely unacceptable for the present invention. The present invention corrects that defect by processing most of the pixels in the frames which the Hazra method would consider "unacceptable" and repeat in their entirety. In that manner, as shall be shown, the present invention delivers the desired effect, in a way that the Hazra invention cannot. This correction feature, which is an integral part of the invention described here, could not have been anticipated by the prior art.

The present invention presents the appearance of immersive, high-impact motion pictures by enhancing previously-produced motion pictures to render the image quality typically associated with advanced motion picture technology. By using contemporary computer techniques, motion pictures that were photographed at twenty-four frames-per-second can be enhanced to appear as though the motion had, instead, been captured at forty-eight frames-per-second. This allows release of previously-produced motion pictures, with an image quality that will satisfy contemporary audiences. Thus, the motion pictures treated according to this invention can generate a new revenue stream for their owners. The enhancement of motion pictures as described here is demonstrated by a working prototype of the system used in the practice of the invention, installed in a commercial motion picture theater.

BRIEF DESCRIPTION OF THE INVENTION

The invention described here is a method for enhancing previously-existing films or motion pictures photographed in a digital format, so that they can be shown in a manner that delivers a high-impact presentation, suitable for contemporary motion picture theatrical audiences. The invention uses digital projection in the preferred embodiment, although the 70 mm film format with five perforations per frame is also suitable. Since nearly all films that were ever commercially produced were photographed at twenty-four frames-per-second, the primary objective of the invention is to enhance films originally photographed at that frame rate, so that they can be projected at forty-eight frames-per-second with the quality of presentation that only the higher frame rate can deliver.

Mere projection at the higher frame rate (48 frames-per-second in this discussion) cannot be done with analog film technology, except by double-frame printing, which cannot realistically simulate the motion that the camera would have captured if the film in question had actually been photographed at a higher frame rate. However, such realistic motion can be simulated using computerized techniques that were originally intended to generate additional frames to create slow-motion effects. The present invention goes far beyond the mere interpolation of extra frames, as will be explained.

The invention renders new images for interpolation between each image of a previously-produced motion picture and the image which succeeds it. This is accomplished through motion estimation, to determine where each pixel of each image from the original motion picture would be at a time exactly half way between the moments of exposure of each original image and its successor. Motion estimation, which is done by computer software, is accomplished by examining the motion of each pixel through a sequence of several frames, not only the previous frame and the next frame. That way, the invention produces new frames that render the scene precisely as it would have appeared one forty-eighth of a second after each original exposure and one forty-eighth of a second before the next original exposure, assuming the original motion picture was photographed at twenty-four frames-per-second. In this invention, there is no blending of images, a technique that was used in the prior art.

In the preferred embodiment of the invention, the enhanced motion pictures are displayed in theaters using commercial digital cinema projection. One of the primary benefits of the invention is a significant increase in apparent native resolution, due to the higher frame rate. For example, 2K digital projection displays an image that is 1080 pixels high and 2048 pixels wide. For a motion picture photographed at 24 frames-per-second, each pixel appears to move a distance on the screen that is twice the distance that it would appear to move if there were 48 discrete images displayed every second. The invention disclosed here doubles the amount of picture information from the original motion picture, thereby yielding the same apparent native resolution as the original motion picture shown at 24 frames-per-second and in 4K format, with an image 2160 pixels high and 4096 pixels wide. Thus, the invention can yield the level of viewing experience comparable to 4K information density. The invention will be able to keep ahead of the trend by taking motion pictures compatible with the native resolution of the 4K format and upgrading them to a level of resolution comparable to 8K digital format; 4320 pixels high and 8192 pixels wide. This level of resolution is superior to that obtained with 70 mm, 5-perforation film, which was the benchmark for high-quality film exhibition.

In the practice of the invention, motion pictures that have already been photographed on film or by digital image capture and produced for public exhibition are first digitized by conventional means known in the art; a step not required for motion pictures photographed by digital means. Then computerized techniques are used to produce new images for interpolation between each successive pair of original images. In this manner, the number of images is doubled, so the resulting motion picture can be projected at forty-eight frames-per-second to deliver forty-eight discrete images every second. These motion pictures can be shown either through digital exhibition methods known in the art, or through 70 mm film projection. For film projection, they are converted back to "film" form, also through means known in the art. In addition, a means for dealing with highly complex motion that could not otherwise be processed by conventional use of the computer software is included as part of the invention.

In the present invention, software is used to produce a transitional "in-between" image for interpolation between each pair of successive images in the original motion picture. Mere interpolation of an image that approximates "half way between" the previous image and the next image (positioned with respect to each image to be interpolated) is not sufficient to deliver the desired effect. Neither are prior methods that blend the two frames and produce pseudo-images that look like a dissolve. Those methods produce excessive motion blur and other undesirable artifacts. Instead, the software used in the invention analyzes the apparent motion change of each pixel through each sequence to render an image which is then interpolated between each image of the original motion picture and the next image of the original motion picture. Because the original images are in digital form when the new images are added, the software enables the user of this invention to control each individual pixel of every image of the entire motion picture, to render interpolated images that appear consistent with the motion of the objects as originally photographed. The result is a precise depiction of what the motion picture would have looked like, if twice as many discrete images had been captured originally, than actually were.

The computerized techniques used in this invention impart the correct amount of motion displacement to each pixel that comprises each of the images that form the motion picture subjected to this enhancement method. Through this technique, films that were actually photographed at twenty-four frames-per-second will appear as if they had originally been photographed at forty-eight frames-per-second. Films originally produced in the 35 mm format can also be converted to the 70 mm format, or its digital equivalent, by adding sufficient picture information to fully exploit the resolution available with the 70 mm film format or its digital equivalent. In the preferred embodiment of the invention, the digital format is used. In some situations, the digital platform can appear superior to 70 mm film.

In the practice of the invention, information is added to the original motion picture in four ways. First, grain is removed, if required, thereby reducing "noise." Next, new "in-between" images are rendered and interpolated using motion vectoring, which adds the necessary visual information. Then, motion blur is reduced, if needed or desired. Finally, the image is sharpened, again if needed or desired. The removal of these artifacts dramatically improves the appearance of the motion picture enhanced by this invention. With the image processing methods now available, processing is so efficient that any transfer or conversion would be considered a "lossless" image conversion. The newly-rendered images appear identical in quality to the frames from the original motion picture. In effect, the artifacts which this invention eliminate or suppress impart a veil that reduces the perception of realism, as the viewers of the motion picture experience. The process described in the present invention "removes the veil" to provide an immersive experience comparable to viewing real life.

In an additional embodiment, computer-generated images can be added selectively, only to certain scenes or sequences in a motion picture originally produced at twenty-four frames-per-second and converted for presentation at forty-eight frames-per-second in the manner described here. Under this application, other scenes would not be altered, but would be repeated, for projection of the entire motion picture at forty-eight frames-per-second. In other words, the added realism that stems from the motion vectoring accomplished by the software used in the invention would be imparted to certain scenes or sequences of a motion picture and omitted from other scenes or sequences. This allows the filmmaker to control whether or not the artifacts that deliver the "legacy" look (such as motion blur) would be suppressed in any specific scene of a motion picture. For example, an action scene would be enhanced for high-impact presentation, while a scene where characters are holding a conversation would retain a "legacy" look. This is a feature of the cinema experience not available with conventional film methods, and only disclosed previously by Weisgerber for new films produced specifically to deliver this effect. Until the present invention, this effect was not available with any motion pictures that had previously been produced. In the present invention, this feature would be under the control of the filmmaker for artistic purposes; in contrast to the Hazra method, which repeats frames only according to the quality of data in any particular frame.

Some scenes capture sufficiently complex motion that the software used in the practice of the invention is unable to keep accurate track of the movement of each pixel of each image over time. An additional feature of the invention is a means to compensate for this inability by over-writing the purpose of the software for selected portions of a specific series of motion picture images, while enabling the software to continue performing its normal function for all other portions of the affected images, as well as for all other images.

The software used in the practice of the invention recognizes the path that each individual pixel of each image is taking at any time, effectively treating each pixel as a vector, whose direction is subject to change with each image of which it is a component. By doing so, the software is capable of "looking ahead" for several frames to chart the path that each pixel is taking. Because of this feature, the software is also able to recognize when the motion of certain objects within an image is too complex to be charted in that manner. In those instances, the software shifts automatically to an operation where such specific image components from the previous original image are dropped into the rendered "in-between" image in the same form that they had in the previous original image. In other words, only the pixels representing this overly-complex motion are repeated, while all other pixels are processed according to the invention, as part of a new image to be added to the motion picture.

In this manner, the "in-between" images that are rendered and then interpolated into the motion picture have the same level of image quality as the frames or images that were captured when the motion picture was originally photographed. This delivers a level of temporal resolution that would not be available at the traditional frame rate of 24 frames-per-second. A higher frame rate of 48 frames-per-second, which is used in connection with the invention, delivers this level of temporal resolution with previously-produced motion pictures, for the first time.

BRIEF DESCRIPTION OF THE DRAWINGS

It should also be noted that the drawings are presented in a highly simplified manner. The images which are enhanced in the actual practice of the invention are far more complex, due to both the inherent complexity of the images themselves and the motion vectoring process used in the enhancement of those images.

DETAILED DESCRIPTION OF THE INVENTION

For enhancement of previously-produced motion picture films to be shown at a frame rate of forty-eight frames per second or higher, the films are converted from analog to digital form by any means known in the conventional art. This step is not required for motion pictures which were originally photographed by digital means. In addition, if a motion picture was originally photographed for exhibition in a 35 mm film format, it is also necessary to add sufficient picture information to allow for reformatting onto the 70 mm film format, or an equivalent digital exhibition format in the preferred embodiment, without loss of picture quality. The process for this enhancement, as described previously, comprises suppressing grain, interpolating rendered images generated by motion vectoring, reducing motion blur and sharpening the resultant images.

Once the images are in digital form, a new image is rendered and then interpolated between each image of the original motion picture and its successive image. These "in between" frames contain new discrete images, generated by computer software. Tachyon Applicance, developed by Cinnafilm, Inc., is suitable for this application. The advantage of Tachyon Appliance lies in the manner in which the program generates the additional images for insertion into the image sequence. The program analyzes the movement of each individual pixel of information, through each sequence of images. It should be noted that the promotional literature for Tachyon Appliance, as found on the company's web site, www.cinnafilm.com, does not mention or contemplate the application proposed in the present invention as suitable for the Tachyon Appliance software. Correction for overly-complex picture information is still required, however, as will be described.

As an example, consider an object (part of an image) depicted in a motion picture that appears to move from left to right across the screen upon which the motion picture is projected. In the conventional art of twenty-four frame-per-second presentation, the object would be seen twenty-four times each second, at different places on the screen. Had the movement of the object instead been captured at forty-eight frames-per-second, there would have been forty-eight discrete images of the object captured during each second, and the object would appear to move approximately half as far from one image to the next than in the twenty-four frame-per-second example.

If the image of the object were to travel across the screen at a constant velocity, the newly-interpolated images would appear exactly half way between each pair of successive images in the original film; the appearance which the prior art would deliver. However, actual motion in real life entails accelerations and decelerations, and contemporary motion picture audiences want to see pictures that accurately depict motion that includes those accelerations and decelerations. The software used in the invention calculates these changes in velocity and generates new images that accurately depict the actual locations of all objects photographed, as they would have actually appeared if twice as many images had been originally captured than actually were.

Figure 1:
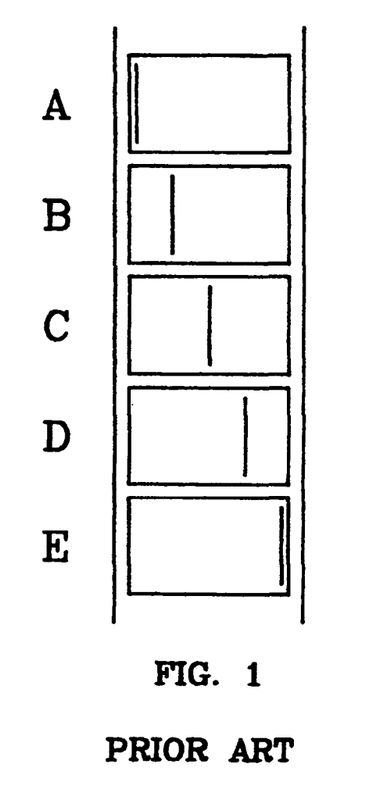
FIG. 1 shows five frames of motion picture film, lettered A through E. A vertical line is shown in each frame to illustrate movement of that line across the frame's field of view.

The effect of the interpolation and motion vectoring of these rendered images can be seen by referring to the drawings. FIG. 1 shows five frames of a motion picture, lettered A through E. These frames represent a short sequence of an existing motion picture, of up to feature length. Instead of the live action that would typically be photographed, FIG. 1 shows a vertical line moving across the field of view represented by the frames in the drawing, for simplicity. In Frame A, the line is at the left side of the frame. It moves one quarter of the distance to the right at Frame B, one half of the distance to the right at Frame C, three quarters of the distance to the right at Frame D, and is located at the right side of the frame at Frame E. It should be noted that, the wider the screen onto which the motion picture is projected, the greater the amount of distance traveled between the positions of the line from one frame to the next. This disparity of displacement causes objectionable stroboscopic effects when conventional motion picture films are projected at twenty-four frames per second onto large theatrical screens. The larger the screen, the more objectionable the disparity of displacement becomes.

Figure 2:
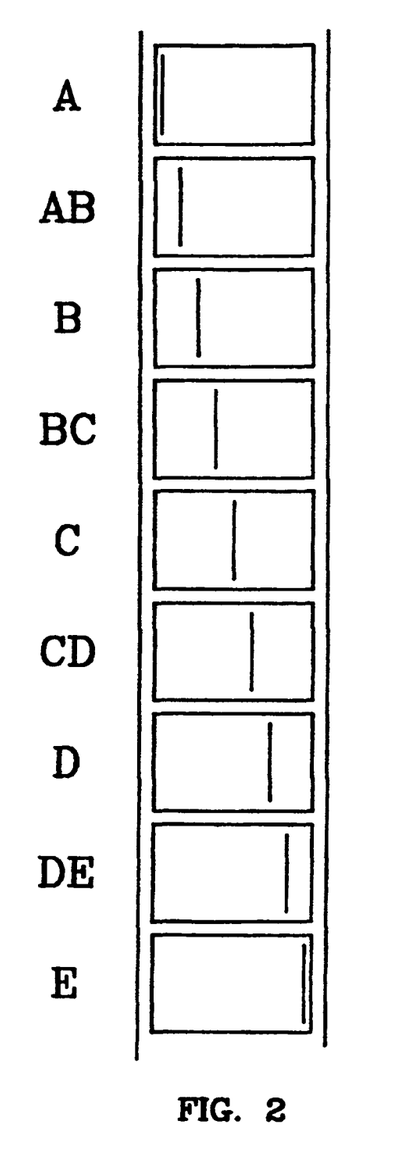
FIG. 2 shows nine frames; the five frames shown in FIG. 1, plus four other frames interpolated between them. Again, a vertical line is shown in each frame to illustrate movement of that line across the frame's field of view.

FIG. 2 shows the same sequence, after enhancement according to this invention. The same five frames from FIG. 1 are shown, but there are now four new images added, one placed between each pair of the original frames. Images AB, BC, CD and DE are new computer-rendered images, designed to appear as discrete images, the way they would look if they were photographed at double the original frame rate of photography (typically forty-eight frames-per-second, instead of twenty-four). This process is repeated for the entire length of the motion picture to be enhanced for exhibition. It should be noted that the position of the vertical line has moved approximately half the distance between images in FIG. 2, compared to its apparent motion between frames in FIG. 1. This reduced displacement from one image to the next cuts down significantly on the undesirable stroboscopic effects inherent in projection at conventional frame rates onto large theatrical screens.

The depiction of the lines in the newly-formed images is simplified for illustrative purposes. If the line in the illustration had been an actual object in a sequence of motion picture images, its placement on each interpolated image would be determined by the capability of the software to analyze motion, and would represent the actual position that the object would have assumed if it had been photographed at the actual frame rate of projection. The word "approximately" in the previous paragraph is critical. In reality, objects that appear to move across the motion picture screen accelerate and decelerate during the apparent journey. If an object actually moved at a constant velocity throughout its range of motion, then each object in the interpolated image would appear exactly half way between its position in the previous image and its position in the subsequent image. A method that produced interpolated images that appear to place all objects exactly half way between their locations in the previous image and the subsequent image would introduce errors; because it would fail to take into account the changes in velocity of the objects as they were photographed.

The software used in the present invention divides the motion of the objects (composed of a multiplicity of pixels) that form an image into intervals one twenty-fourth of a second long, corresponding to each frame of a motion picture. Within each such increment of motion, the software analyzes changing velocities of the objects in each image and determines the position of each such pixel at the midpoint in time between the previous image and the next image in sequence. In operation, the software looks ahead for several frames, to determine how each pixel is moving at the time. It then renders the state of the motion of each pixel exactly half-way between each frame from the original motion picture and the next frame. Accordingly, the result is a highly accurate representation of the scene as it would look if it had actually been photographed at double the frame rate at which the images were originally photographed or produced. In other words, if a motion picture originally photographed at twenty-four frames-per-second is processed according to the invention described here, the result would look precisely the way the same movie would have looked if it had actually been photographed at forty-eight frames-per-second. As a result, the viewers of motion pictures enhanced according to this invention would observe motion exactly as it would have appeared if photographed at 48-frames-per-second. They would not see a pseudo-motion created by blending the previous and next images in the original motion picture, which will result in less than a desirable, smooth, high-frame-rate depiction of motion.

The amount that each pixel is moved in the horizontal and vertical directions is determined by the recent history of displacement of that pixel over the run of recent previous images. In other words, the software analyzes the displacement of each pixel from frame to frame, taking into account the velocity of that pixel at any given frame (first time derivative of the displacement) and any changes in velocity that occur in the movement of that pixel (second time derivative of displacement). In that way, the displacement of every pixel is charted for each image of the entire motion picture. Given these motion vectors for each pixel, the software renders a precise "in between" image for interpolation between each image and its successive image of the original motion picture to replicate what the motion picture would have actually looked like if it had been photographed at double the frame rate at which it was originally photographed or produced. The software also permits manual adjustment of the location of any pixel or group of pixels to modify the image that the software presents as the simulated "in-between" image.

As mentioned previously, Tachyon Appliance (Tachyon), produced by Cinnafilm, Inc., is suitable for the practice of this invention, and has been used for demonstration purposes. Specifically, Tachyon is capable of tracking each pixel not only between its neighboring frames before and after, but within the range of two frames before and two frames after. A tutorial video on Cinnafilm's web site www.cinnafilm.com, says that the software can track a pixel from its "nearest neighbor or temporally blended from two nearest neighboring frames" (at 16:17 to 16:23). This means that, in addition to tracking the displacement of each pixel, the software also is tracking not only the velocity with which a pixel moves from one frame to the next, but the acceleration or deceleration of that pixel over a longer time, as well. By dealing with accelerations and decelerations, in addition to velocities and displacements, the software analyzes vectors that are more complex than simple linear vectors. The vectors created by the software, which change from frame to frame., are actually the simultaneously-generated solutions to first-order and second-order differential equations. Because the operation performed by the software is so mathematically complex, the exact location of any given pixel can be determined more precisely for creating an accurate "in-between" image than had been possible in the practice of the prior art, including the Cok inventions. This rendered image represents precisely what the camera would have captured if it had been photographing action at forty-eight frames-per-second, rather than twenty-four., as it did when the motion picture in question was originally produced.

It should also be noted that the application disclosed and claimed here was not originally contemplated in the material distributed by Cennafilm, Inc. to promote the Tachyon Appliance software and explain its use. The video cited previously, the Transcoding Tutorial entitled "Creating Transcode Profiles" describes the program as capable of accommodating the 4K digital format at several frame rates, but 48 frames-per-second is not one of them. The example mentioned in the video is a conversion between 24 and 30 frames-per-second (precisely 23.976 and 29.97), without any mention that the 24-to-48 frame-per-second conversion, which forms the subject matter of this invention, was contemplated. The narrator in the above-cited video states (at 15:47 to 16:00): "It takes areas and it will paste in slivers of the image from neighboring frames, either temporally blended or just nearest neighbor, whenever there's a chance for artifact-generation." The "temporally blended" feature is used in this invention. In the practice of this invention, using it and the error-correction feature described below, the invention produces an upgraded motion picture for presentation to contemporary theater audiences.

Sometimes the motion of a portion of the images in a sequence is so complex that the software used in the invention cannot follow it accurately to produce precise in-between images, free of artifacts. The invention includes a feature for correcting that deficiency. In the images that contain such complex motion, the specific pixels of those images which contain such complex motion are replaced by comparable pixels of the images as they were originally photographed. In other words, only those specific pixels are repeated, and they comprise only a small portion of each of those images. This correction does not detract from the overall audience perception of image dominance at the higher frame rate of exhibition, typically forty-eight frames-per-second, because viewers will not notice the correction. However, this method does prevent degradation of the portion of the affected images that would otherwise result from the software's inability to track complex motion accurately, which would result, instead, in repeating entire frames, as was the practice in the prior art (specifically Hazra 614).

The feature, selectively treating parts of images while refraining from treating the rest of each of those images, is a vital feature of the invention, and was not anticipated in the prior art. The application of this correcting feature can be seen in the drawings, specifically FIGS. 3, 4 and 5. The drawings are highly simplified to illustrate a principle. Since the motion to be treated according to the invention is very complex, it is impossible to depict it accurately in simple drawings.

Figure 3:
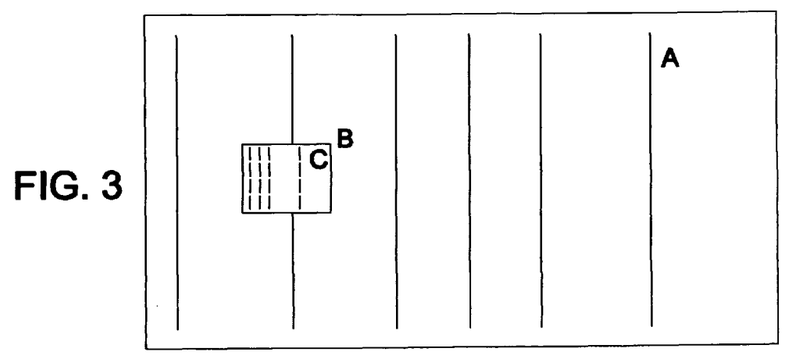
FIG. 3 shows a single frame, with lines representing pixels which form a portion of that frame, and an insert containing other lines, which represent a portion of the information in that frame that is treated according to a correction feature which forms part of the invention.

Referring to FIG. 3, a series of lines A represent pixels that form a small part of the image on a frame from a motion picture. In practice, the motion depicted in an actual motion picture image would be vastly more complex. A square area B represents a portion of the image whose motion is so complex that the software used in the practice of the invention would be incapable of accurately reproducing the location of each pixel of that image portion in the location where it would have appeared exactly half-way in time between one original motion picture frame and the next. In practice, the area shown as square would be an irregular shape, with straight and curved edges in different places; perhaps even discontinuous in nature. Dotted lines C represent a few pixels that form a small part of the image in area B. In practice, the motion depicted in a portion of an actual film frame would be vastly more complex.

Figure 4:
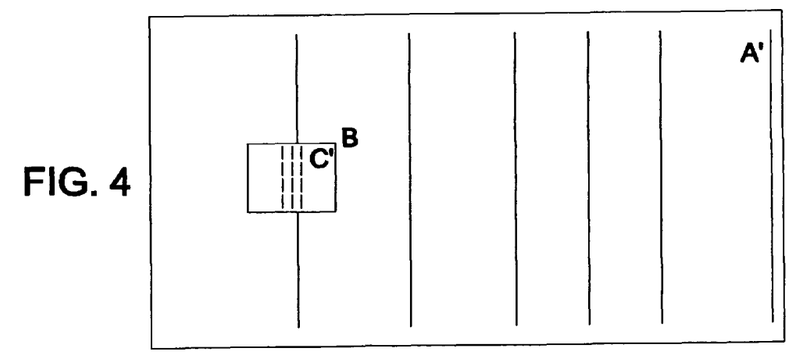
FIG. 4 shows the next frame in sequence, after the frame depicted in FIG. 3.

FIG. 4 shows the next frame in a motion picture, after the frame shown in FIG. 3. In the conventional motion picture art, the frame represented in FIG. 4 would have been photographed one twenty-fourth of a second later than the frame represented in FIG. 3. The positions of lines A' and dotted lines C' are different than they were in FIG. 3.

Figure 5:
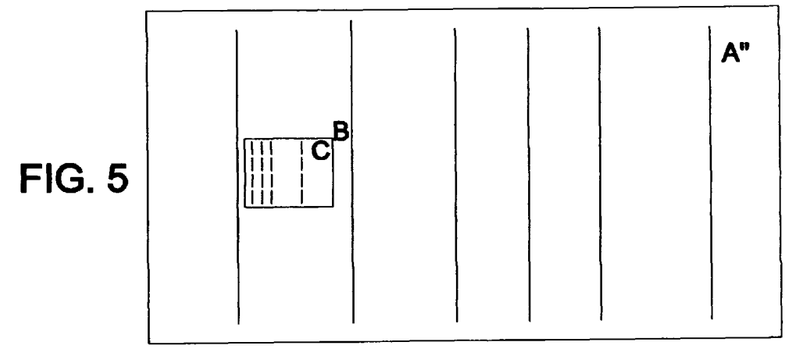
FIG. 5 shows a rendered image to be projected after the image in FIG. 3 and before the image in FIG. 4, applying the correction feature which forms part of the invention. It should be noted that FIG. 5 is positioned between FIG. 3 and FIG. 4 on the drawing sheet, because the image represented in FIG. 5 would be inserted between the images represented by FIG. 3 and FIG. 4 in the practice of the invention.

FIG. 5 represents an image to be placed half way between the image represented by FIG. 3 and the image represented by FIG. 4. It is placed between FIG. 3 and FIG. 4 on the drawing sheet to mark its position as an interpolated image, rendered according to the invention and placed between the images from the original motion picture, which are depicted in FIG. 3 and FIG. 4.

Without the correction feature disclosed here, none of the image would be singled out for special treatment, and the lines would appear as if FIG. 5 represented their location half-way in time between the frame represented in FIG. 3 and the frame represented in FIG. 4. Because of the complexity of the motion occurring in Area B, the pixels within Area B are treated differently than those which comprise the rest of the image outside Area B, so that the entire image appears to be free of unnatural artifacts.

In the practice of the invention, only the pixels within Area B are segregated for special treatment and specifically repeated at the positions they occupied in the image represented by FIG. 3. Therefore, FIG. 5 contains lines outside Area B at positions designated A", while lines inside area B remain at positions designated C; the same as in FIG. 3. Area B, with its complex motion, would appear corrupted to the recognition feature of the software used in the practice of the invention. Taking only this small "corrupted" area and seamlessly replacing it with image components from the previous original frames produces an appearance which is internally and externally consistent as viewed.

With this feature, the result is that most of an image containing a component of complex motion is treated in the normal manner of this invention. Only specific pixels whose motion is highly complex are repeated, so the overall impression for viewers of the motion pictures enhanced according to this invention, to the maximum extent possible, is that of a motion picture that was originally photographed at the higher frame rate.

The novel use of the software in the practice of the invention is to detect motion that is too complex for the software to handle in the conventional manner, treat that motion as an error, dissect out portions of images that constitute such an error, and correct the error in the "in-betwen" images that it renders. Since the "error" constitutes only a small part of the affected images and those images constitute only a small portion of the entire motion picture that is enhanced according to the invention, the high-impact effect on the audience is delivered without undesirable artifacts.

The invention described delivers enhanced versions of films produced in the 35 mm format by augmenting the information packing density associated with the 35 mm format, to the level associated with the 70 mm film format or its digital equivalent. In effect, the method described here adds more information to existing films, so the audience will perceive more visual information than was placed onto the original film in the original production. While it is envisioned that the invention described will be used primarily with motion pictures produced through film methods known in the art, the invention is also suitable for enhancement of motion pictures produced through 24P digital acquisition.

The beneficial effect of this invention can also be imparted selectively to specific scenes or sequences of a motion picture. The invention can be used to enhance only those specific scenes or sequences of a motion picture, when the producer of that picture desires to withhold the full immersive effect from the viewers for part of it. For those specific scenes or sequences, the original frames are repeated. This allows intentional retention of the artifacts inherent in double-frame printing for an artistic effect, although the present invention is designed to eliminate them under normal circumstances. Thus, these artifacts can be either eliminated or retained for any specific scene or sequence of a motion picture. Unlike the previous Weisgerber 614 invention, the benefit can be imparted and removed selectively when enhancing a previously-produced motion picture.

The present invention also allows previously-produced stock footage, which is often stored in film libraries and film studio collections, to be enhanced in a cost-effective manner for use in the production of new motion pictures. By using the invention described, such "stock" film sequences (photographed at twenty-four frames-per-second) can be converted to appear as if they had been photographed at forty-eight frames-per-second, with the motion vectoring feature simulating the look that would have been captured by actual 48-frame-per-second photography. Such stock sequences can then be used in connection with the production of new motion pictures, with no loss of image quality that would be caused by using images recorded in an "old" film format and through an "old" method.

By using digital enhancement methods and computerized image processing to add sufficient information to each image to accommodate the 70 mm format or its digital equivalent, as well as to render new images to fit between each of the previously-photographed images, the conversion can be accomplished efficiently, without loss of light, image clarity or resolution associated with optical conversion methods. The method described reduces grain and improves apparent resolution, resulting in an immersive presentation, which delivers the image clarity associated with real life.

The invention allows motion picture theatrical audiences to view a motion picture that was originally produced at twenty-four frames-per-second without the artifacts associated with that frame rate: judder, strobescopic effects and motion blur. Elimination or reduction of these objectionable artifacts associated with the original frame rate in which the motion picture was produced adds a dimensionality to the view delivered to the audience. The additional images imparted in the practice of the invention help to deliver a more immersive experience than is available at the lower frame rate. The result is a presentation that simulates a three-dimensional look, without the need to spend the large amounts of money required for the production or post-production of motion pictures in 3D formats. In effect, the invention creates a multiple-plane effect that looks somewhat like 3D, which adds dimensionality to 2D exhibition, further enhancing the viewing experience. This application is not limited to live action, but can also be used to upgrade animation that was originally drawn or produced at 24 frames-per-second, for an improved presentation at 48 frames-per-second. The invention would remove the same objectionable artifacts from upgraded animation sequences as it removes from live action sequences.

The invention described permits the showing of previously-produced motion pictures with the level of picture clarity consistent with new motion picture production. Contemporary standards now render the conventional frame rate of twenty-four frames-per-second inadequate to sufficiently suppress undesirable artifacts such as stroboscopic effects. With the actual analysis of motion vectors between each frame, however, the interpolated images developed in accordance with this invention eliminate these effects by replicating the motion that the camera would have actually captured if it had operated at the higher frame rate in the first place.

Another collateral benefit of this invention is that the dynamic image enhancement described also reduces grain, sharpens images and produces an image with a superior appearance on large theatrical screens, compared to those available through conventional means. With conventional film technology, there is more objectionable grain and lower apparent resolution than with the present invention.

Digitizing the film images before engaging in the enhancement process improves the impact of a theatrical motion picture presentation without sacrificing picture quality. This diminution of picture quality is inherent in optical enlargement of films originally produced in the 35 mm film format and converted to the 70 mm film format. In effect, the change in formats is done much more efficiently with digitized images than with conventional film images. In addition, imparting "in-between" images that effectively replicate the actual appearance of an image that would have been photographed between each pair of images in the original motion picture is a technique for delivering a result that is only available through use of the invention described here.

The method described here has limitless possibilities to enhance a motion picture feature film. The use of photography and exhibition at 48 frames-per-second delivers an appearance comparable to live television. Even though the content of Peter Jackson's recently-released 3D-format version of the motion picture *The Hobbit* was based on J. R. R. Tolkein's fantasy novels, the motion picture itself looked more like real-time events than a fantasy, because it was photographed and displayed at 48 frames-per-second. With the invention described here, essentially any previously-produced motion picture can be enhanced to provide a similar appearance, despite the fact that the motion picture was produced at a lower frame rate.

While the basic invention and the preferred embodiment have been described, this description should be thought of as illustrative and not limiting. Other frame rates, such as fifty or sixty frames-per-second, can be used. So can other film formats. Digital exhibition formats and methods are suitable for the invention, and are used in its preferred embodiment. Other embodiments are also possible, and they should be thought of as lying within the scope of the invention.

The invention claimed is:

1. A method of producing transitional cinematic images insertable between successive frames of a previously-produced motion picture to enhance the native temporal and spatial resolution thereof, the method comprising the steps of:
    (a) dividing the motion picture into intervals $1/N^{th}$ of a second long, each interval corresponding to a frame of the native motion picture;
    (b) dividing each frame into a frame matrix of x, y, orthornormal pixels, in which x represents the direction of travel of the motion picture and y represents the height of a pixel within the frame matrix;
    (c) generating a displacement vector for each horizontal and vertical coordinate of a current x, y pixel based upon a plurality of frame matrices, said plurality corresponding to a recent history of displacement of a given pixel and extending into several prospective frames for each x and y coordinate of each pixel of each frame matrix, and then calculating an average displacement for each current x, y pixel coordinate over said plurality of frames;
    (d) generating a velocity vector for each horizontal and vertical coordinate of a current x, y pixel based upon a plurality of frame matrices, said plurality corresponding to a recent history of velocity of a particular pixel, and extending for several frames beyond said current pixel of the frame matrix, and then calculating an average velocity over said plurality of frame matrices thereof for each current x, y pixel coordinate;
    (e) generation an acceleration vector for each horizontal and vertical coordinate of a current x, y pixel based upon a plurality of frame matrices, said plurality including both the recent history of acceleration of said pixel and continuing therefrom for several frames beyond said current pixel of a current frame matrix, and then calculating an average acceleration over said plurality of frame matrices for each x and y pixel coordinate;
    (f) generating an interpolation vector, the elements thereof comprising resultant calculations of each of said steps (c), (d), and (e) above;
    (g) applying said interpolation vector to said current x, y pixel to generate an interpolation pixel having x, y coordinates incremented by said displacement, velocity and acceleration values of said interpolation vector;
    (h) repeating steps (c) through (g) above for each pixel of a current frame matrix; and
    (i) inserting a frame matrix resultant of said step (h) midway between respective pixels of a current frame matrix and its successive frame matrix, said insertion occurring for each matrix frame.

2. The method as recited in claim 1 further comprising the steps of
    (j) identifying a corrupted pixel or group of corrupted pixels within a matrix frame; and
    (k) replacing said pixels by corresponding pixels of a preceding matrix frame.

3. The method as recited in claim 1, further comprising the step of:
    (l) digitizing said motion picture, prior to step (a).

4. The method as recited in claim 1, further comprising: doubling a capture rate at which said motion picture was originally made; and
    (m) employing said interpolation vector resultant calculations of said steps (c), (d) and (e) above to provide interpolation frames using said interpolation pixels.

5. The method as in claim 1 in which N=30, so that motion pictures originally produced for exhibition at thirty frames-per-second are enhanced according to the method described and subsequently exhibited at sixty frames-per-second.

6. The method as in claim 1, in which N=24, so that motion pictures originally produced for exhibition at twenty-four frames-per-second are enhanced according to the method described and subsequently exhibited at forty-eight frames-per-second.

7. The method as in claim 6, in which motion pictures enhanced according to the method described are exhibited to audiences by digital projection or in the 70 mm film format.

8. The method as in claim 1, in which some scenes or sequences of such motion pictures are enhanced according to the method describe& while other scenes or sequences of the same motion picture are not enhanced, and retain the look they had when they were originally photographed.

9. The method as in claim 1, in which previously-photographed motion picture sequences are enhanced according to the invention, for insertion into new motion pictures, as part of such new motion pictures.

10. The method as in claim 1, further comprising a means for producing said images when a portion of the motion originally captured is more complex than the second derivative of displacement.

11. The method as in claim 10, in which special treatment is given to selected pixels which form part of certain images of said motion pictures; such pixels depicting motion more complex than the second derivative of displacement.

12. The method as in claim 11, in which selection and treatment of such pixels is accomplished through the software used in the invention; said software recognizing that certain pixels in certain images of said original motion picture cannot be processed.

13. The method as in claim 12, in which nearly an entire motion picture is enhanced for projection at double the frame rate at which said motion picture was originally photographed or otherwise recorded, while certain specific pixels within certain images are singled out and not enhanced, and appear as they were originally photographed or otherwise recorded.

14. The method as in claim 13, in which motion pictures originally photographed at twenty-four frames-per-second are enhanced and projected at forty-eight frames-per-second, with the exception that certain pixels of certain images are specially treated to appear as they were originally photographed or otherwise captured.

15. The method as in claim 10, whereby said method is executed automatically, under the control of said software and through the feature of said software that recognizes the motion trajectory of each pixel of each image of the original motion picture that is enhanced according to the invention.

16. A method for enhancing previously-produced motion pictures for exhibition to theatrical audiences at double the frame rate at which said motion pictures were originally photographed, for delivery of a heightened impact upon the members of said audiences, whereby such motion pictures are treated according to the method described in claim 1, and whereby the improvement comprises the use of computerized image-rendering techniques to produce additional images; such techniques evaluating the displacement, velocity and acceleration of each pixel of each of the images in the original motion picture, and such techniques evaluating motion vectors for each such pixel, and such additional images being interpolated between each of the original images of said motion picture and the next image in succession, to depict accurately the exact appearance that said previously-produced motion pictures would have had if they had originally been photographed at the frame rate at which they are displayed to said audiences.

17. The method as in claim 16, in which said motion pictures were photographed or otherwise originally recorded at twenty-four frames-per-second and enhanced for exhibition at forty-eight frames-per-second.

18. The method as in claim 17, in which motion pictures originally photographed in a 35 mm film format are enhanced for exhibition in a 70 mm film format or its digital equivalent.

19. The method as in claim 16, in which said method is executed automatically, under the control of said software and through the feature of said software which recognizes the motion trajectory of each pixel of each image of the original motion picture that is enhanced according to the invention.

* * * * *